(12) United States Patent
Tyson

(10) Patent No.: US 6,541,923 B1
(45) Date of Patent: Apr. 1, 2003

(54) ELECTRONIC BALLASTS

(75) Inventor: Lawrence Samuel Tyson, Surrey (GB)

(73) Assignee: Microlights Limited, Marlborough (GB)

(*) Notice: Subject to any disclaimer, the term of this patent is extended or adjusted under 35 U.S.C. 154(b) by 0 days.

(21) Appl. No.: 09/831,606

(22) PCT Filed: Nov. 18, 1999

(86) PCT No.: PCT/GB99/03851

§ 371 (c)(1),
(2), (4) Date: Jun. 13, 2001

(87) PCT Pub. No.: WO00/30413

PCT Pub. Date: May 25, 2000

(30) Foreign Application Priority Data

Nov. 18, 1998 (GB) ................................. 9825298

(51) Int. Cl.⁷ .......................... H05B 41/16; H05B 37/02
(52) U.S. Cl. ........................................ 315/224; 315/291
(58) Field of Search ......................... 315/209 R, 214, 315/215, 224, 291, 300, 307, 158, 219, DIG. 2

(56) References Cited

U.S. PATENT DOCUMENTS

| 4,060,752 | A | * | 11/1977 | Walker ........................ 315/244 |
| 4,818,918 | A | * | 4/1989 | Murphy ....................... 315/244 |
| 5,519,289 | A | * | 5/1996 | Katyl et al. ................. 315/224 |
| 5,933,340 | A | * | 8/1999 | Adamson ..................... 363/97 |
| 6,072,283 | A | * | 6/2000 | Hedrei et al. ................ 315/307 |
| 6,075,326 | A | * | 6/2000 | Nostwick ..................... 315/307 |
| 6,088,249 | A | * | 7/2000 | Adamson ..................... 363/97 |
| 6,121,778 | A | * | 9/2000 | Moore ........................ 324/619 |
| 6,181,078 | B1 | * | 1/2001 | Sekiguchi et al. ........... 315/242 |
| 6,191,537 | B1 | * | 2/2001 | Celso ......................... 315/219 |
| 6,229,270 | B1 | * | 5/2001 | Stephenson et al. ........ 315/291 |
| 6,239,556 | B1 | * | 5/2001 | Derra et al. ............... 315/209 R |
| 6,300,722 | B1 | * | 10/2001 | Parra ....................... 315/209 R |

FOREIGN PATENT DOCUMENTS

| DE | 4425679 | 8/1995 |
| DE | 19505476 | 8/1996 |
| DE | 19626101 | 1/1997 |
| EP | 059064 | 9/1982 |
| EP | 0271396 | 6/1988 |
| EP | 0794694 | 9/1997 |
| WO | 9825441 | 6/1998 |

* cited by examiner

Primary Examiner—Don Wong
Assistant Examiner—Minh D A
(74) Attorney, Agent, or Firm—Merchant & Gould, P.C.

(57) ABSTRACT

A lighting system (1) having a high intensity discharge lamp (16) and an electronic ballast having a variable frequency generator (10) which is arranged to vary the frequency of the ballast output over a range of frequencies having a minimum frequency of 400 kHz; a reactance is included in a joint operating circuit (22) in and between the ballast generator (10) and lamp (16) such that the circuit resonate to provide a starting voltage for the lamp at or above the minimum frequency. The arrangement inhibits lamp flickering and improves overall lamp and system efficiency.

12 Claims, 7 Drawing Sheets

ELECTRONIC BALLASTS

CROSS REFERENCE TO RELATED APPLICATIONS

STATEMENT REGARDING FEDERALLY SPONSORED RESEARCH OR DEVELOPMENT

REFERENCE TO A "MICROFICHE APPENDIX"

BACKGROUND OF THE INVENTION

1. Field of the Invention

The present invention relates to electrical lighting systems and to electronic ballasts therefor for High intensity discharge lamps.

2. Description of Related Art

Such lamps have a high impedance before they are lit, and a low impedance while they are lit. High intensity discharge lamps are characterised by a short arc length, typically less than 20 mm for a 70 watt lamp, and have a sealed envelope containing at least two electrodes for an electrical discharge, and typically have a high internal pressure when hot.

High intensity discharge lamps are in widespread use. A disadvantage of these lamps is that additional components are required for their proper operation. In particular a means of limiting or controlling the current drawn by the lamp is required, together with a means of starting an arc discharge in the lamp.

The arrangements of components associated with the control of lamp current are commonly referred to as a "ballast", whilst those components performing the function of starting the lamp are collectively referred to as the "ignitor".

Traditionally the ballast function was performed by a large and heavy inductor operating at the power line frequency, whilst the ignitor function was performed by the generation of high (2–5 kV) voltage impulses superimposed onto the supply terminals of the lamp.

More recently electronic means have been devised for operation of discharge lamps in order to overcome some of the disadvantages associated with traditional methods of lamp operation. These disadvantages included size, weight, and a lack of any means of accurately controlling lamp power with variations in supply voltage or frequency.

The electronic ballast means employed to date have been successful in overcoming the above mentioned disadvantages, but as a result of their complexity, new disadvantages of cost and reliability have prevented their widespread use. It is convenient to describe such electronic ballasts as utilising "square wave technology" because of their output waveforms.

One of the reasons for the complex design of square wave technology ballasts, (which operate lamps at relatively low frequencies 50–400 Hz for example), is that discharge lamps exhibit undesirable instabilities when operated in the frequency range of 1 khz–300 kHz. Elaborate electronic topologies are required to generate low frequencies with power levels and control characteristics suited to discharge lamps.

Should the operating frequency (or some harmonic or sub harmonic of the operating frequency) be such as to excite standing waves of pressure within a lamp then undesirable movement or even extinction of the arc can occur. This can be damaging to the lamp since arc movement can cause the arc to impinge upon the burner walls with consequent lamp failure. At the very least these movements of the arc spoil the quality of illumination obtained.

The above mentioned instability and standing waves of pressure are manifestations of a phenomenon known as "acoustic resonance". Acoustic resonance arises as a result of pressure variations in the lamp caused by the operating frequency or some harmonic or sub harmonic of the operating frequency.

BRIEF SUMMARY OF THE INVENTION

According to the invention there is provided a lighting system comprising at least:

a) a high intensity discharge lamp, b) an electronic ballast having a regulated alternating current power output, c) a joint operating circuit included in and between the ballast and the lamp, d) the ballast having a variable frequency generator which is arranged to vary the frequency of the ballast output over a range of frequencies, with a minimum frequency of 400 kHz, e) the circuit having a reactance such that the circuit is arranged to be resonant to provide a starting voltage for the lamp at or above the minimum frequency.

A benefit of such a ballast is that it may be manufactured at low cost which when operating the discharge lamp has a high efficiency and reliability. A benefit of operating at a high frequency greater than 400 kHz and greater than a maximum acoustic resonant frequency of the lamp is that the life of the lamp and the quality of the illumination is improved by the avoidance of acoustic resonance.

Preferably a maximum frequency of the range is such that the power output is sufficient to maintain operation of the lamp.

A benefit of restricting the frequency range is that stable operation of the lamp is ensured.

Preferably the ballast of the invention is arranged to regulate the power output to the lamp by varying the frequency of the ballast output.

A benefit of arranging the ballast of the invention to control the power to the lamp is that the lamp may be operated at its optimal rating, and the effect of variations arising from manufacturing tolerances may be minimised.

Preferably the high intensity discharge lamp comprises a sealed envelope containing at least two electrodes for an electrical discharge.

Preferably the ballast or frequency generator of the invention operates in a frequency range of between 400 kHz to 30 MHz. More preferably the frequency generator operates in a frequency range of between 400 kHz and 1,500 kHz.

Preferably the ballast is arranged to provide a constant power to the lamp when it is running in a steady state, and a higher current during a starting phase of the lamp. Preferably the starting phase of the lamp is transient, and of a short duration.

A benefit of providing a higher current during starting is that the lamp reaches its operating condition more quickly and reliably.

Preferably the ballast is arranged to limit the higher current to a permissible value within a safe rating of the lamp.

Preferably the alternating current output wave form is of a substantially sinusoidal waveform with a harmonic distortion of less than 40%.

More preferably the substantially sinusoidal waveform has a harmonic distortion of less than 15%.

A benefit of an electrical output with a sinusoidal wave form is that a sine wave has only one fundamental frequency, compared with a square wave where a Fourier analysis shows the square wave form to comprise a very large range of frequencies. Hence in avoiding the excitation of acoustic resonance, with an output with a sinusoidal wave form it is only necessary to avoid the resonances that may be excited by one frequency.

A further benefit of a sine wave is that the rate of change of voltage with time dv/dt is minimised. This reduces the stress on electrical and electronic components in the control, reducing a cause of failure. A benefit of this is that the size of components may be reduced, both reducing cost and size.

Another benefit of a sine wave is that the electrical efficiency of the control is improved and hence the light output from the lamp per power input is improved.

Preferably the frequency of the output may be varied while the lamp is in a lit state.

A benefit of this is that by varying the frequency of the output any excitation of acoustic resonance by a subharmonic of the output frequency may be reduced.

Preferably the frequency of the output is varied at a rate greater than 50 Hz. A benefit of this is that any acoustic resonance that may occur does not have an opportunity to develop to an amplitude that would cause an arc within the lamp to impinge on an internal surface of a burner of the lamp. A further benefit is that the perception of flicker caused by the variation of light output arising from the change in lamp power arising from such frequency variation is minimised.

An additional benefit of this is that although any acoustic resonance is undesirable, lamps may withstand such resonance provided that it is not allowed to develop to such an amplitude that causes the arc to be deflected onto the internal surface of the burner. When the arc is deflected so that it impinges on the internal surface of the burner damage is caused to the burner, and the life of the lamp is reduced. Acoustic resonance of a lamp frequently takes many hundreds of cycles before it has built up such an amplitude.

Preferably the reactance of the invention comprises a series arrangement of an inductance and a capacitor arranged so that the output frequency is above a resonant frequency of the reactance.

A benefit of this is that the reactance presents an inductive load to an output switching part of the ballast. The output switching part may comprise at least two inverter transistors.

Preferably the ballast is arranged to provide the alternating current output by alternate switching of at least two inverter output transistors driven by a discontinuous alternating waveform, the waveform containing a period within every half cycle when neither output transistor conducts.

A benefit of the discontinuous waveform is that the efficiency and reliability of operation of the transistors and hence the ballast is enhanced.

Preferably the output power is arranged to pass through a capacitor in series with the lamp, the value of capacitance being sufficiently small to limit a current flow, through the lamp at a frequency of the electrical power input to the ballast, to less than 30 mA.

A benefit of this is that safety may be improved by preventing a hazardous current flowing from the terminal at a supply frequency.

Preferably the reactance comprises a control reactance in the ballast and a lamp reactance mounted to the lamp.

Preferably in an embodiment the reactance comprises a control reactance in the ballast and a lamp reactance mounted to a lampholder for receiving the lamp. Preferably removal of the lamp from the lampholder is arranged to disconnect the lamp reactance from the ballast.

Preferably a connection to the lamp is arranged so that the lamp can be replaced, and a capacitance is placed across the lamp in a parallel current path to the lamp, the capacitance being arranged such that disconnection of the lamp from the ballast output disconnects the capacitance from the ballast, the variable frequency generator being so arranged to sweep over a pre-determined range of frequencies to produce by means of a resonant circuit including the said capacitor a specific high frequency high voltage output to ignite the lamp.

Preferably the lamp reactance is mounted in thermal proximity to the lamp.

Preferably the electronic ballast comprises means for igniting the lamp, and preferably a required ignition voltage is generated by the reactance.

Preferably a value of the reactance and a value of a first lamp reactance have a combined value, and such values are arranged so that the ballast will be resonant only by means of the combined value. In an embodiment of the invention, preferably the value of lamp reactance is arranged so that a second lamp of a second power rating with a second value of lamp reactance will be such that the ballast will not be resonant when the second lamp is fitted to the circuit.

A benefit of an embodiment of the invention is to overcome the disadvantages of cost and complexity associated with square wave technology so that a more widespread use of electronic ballasts, in conjunction with discharge lamps, is possible.

A benefit of an embodiment of this invention is that lamps may be operated with a substantially sinusoidal waveform of current at frequencies higher than any which would excite acoustic resonance in discharge lamps. A benefit of this mode of operation is that the complexity of the ballast is greatly reduced. A further advantage may be obtained by utilising reactive components already present within the ballast to generate the high voltages required for lamp ignition, thereby avoiding the need for a separate ignitor.

BRIEF DESCRIPTION OF THE SEVERAL VIEWS OF THE DRAWINGS

Specific embodiments of the invention will now be described by way of example with reference to the accompanying drawings in which.

DETAILED DESCRIPTION OF THE INVENTION

Figure 1:
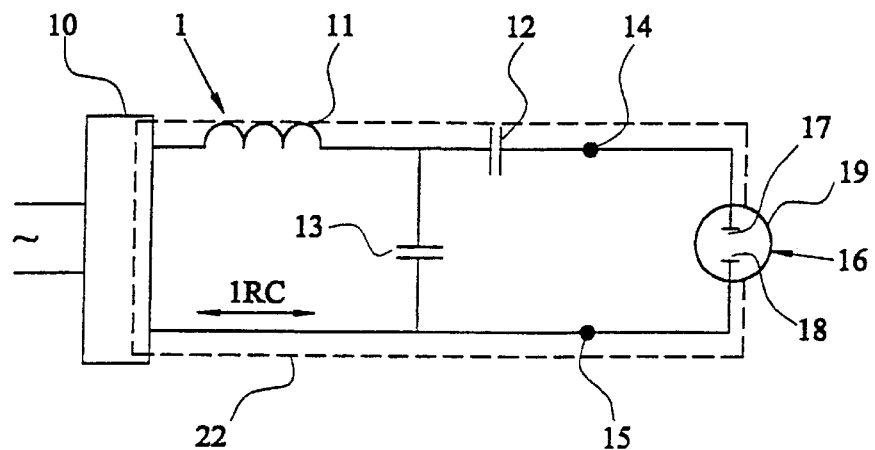
FIG. 1 is a circuit diagram for operation of a lamp from a high power signal generator of a first embodiment of the invention.

FIG. 1 shows operation of a lamp from a high power signal generator 10 of a first embodiment 1 of the invention. The generator has negligible internal impedance, produces a square wave voltage output of amplitude 350 volts, and has an output variable over a wide range of frequencies. The wide range of frequencies is preferably from 400–1,500 kHz. A high intensity discharge lamp 16 is coupled to the generator via an inductor 11, and a capacitor 12 at disconnection points 14 and 15. Lamp 16 comprises a sealed envelope 19 containing electrodes 17 and 18 arranged for an electrical discharge when the lamp is lit. A further ignition capacitor 13 is provided. A joint operating circuit 22 is included in and between the generator 10 and the inductor 11 the capacitors 12 and 13 and the lamp 16. The operation of this circuit will now be described.

The initial conditions assumed are:
1. Output is available from the signal generator.
2. The signal generator has been set to its maximum output frequency.
3. That the lamp is not lit.

Table 1 below shows by way of example values of the inductor 11 and capacitor 12 which have been chosen to suit the power of the lamp used, which for this example, is 70 watts.

TABLE 1

Figure 1A:
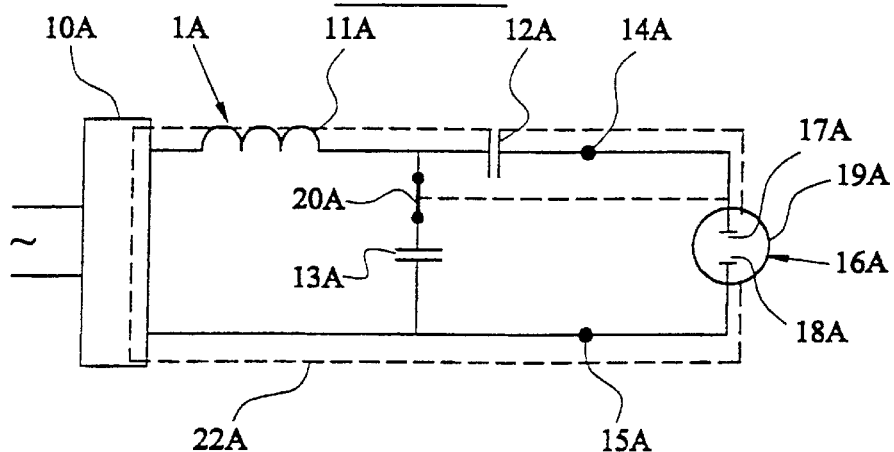
FIG. 1A is a circuit diagram of second embodiment of the invention for the operation of a lamp from a high power signal generator.
Figure 1B:
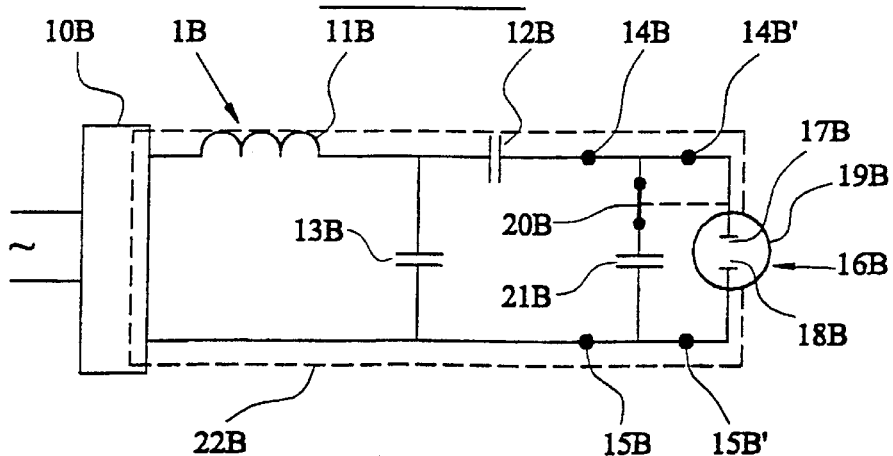
FIG. 1B is a circuit diagram of third embodiment of the invention for the operation of a lamp from a high power signal generator.

| FIG. 1 | | FIG. 1A | | FIG. 1B | |
|---|---|---|---|---|---|
| Inductor 11 | 76 µH | Inductor 11A | 76 µH | Inductor 11B | 76 µH |
| Capacitor 12 | 11 nF | Capacitor 12A | 11 nF | Capacitor 12B | 11 nF |
| Capacitor 13 | 1.5 nF | Capacitor 13A | 1.5 nF | Capacitor 13B | .75 nF |
| | | | | Capacitor 21B | .75 nF |

Figure 3:
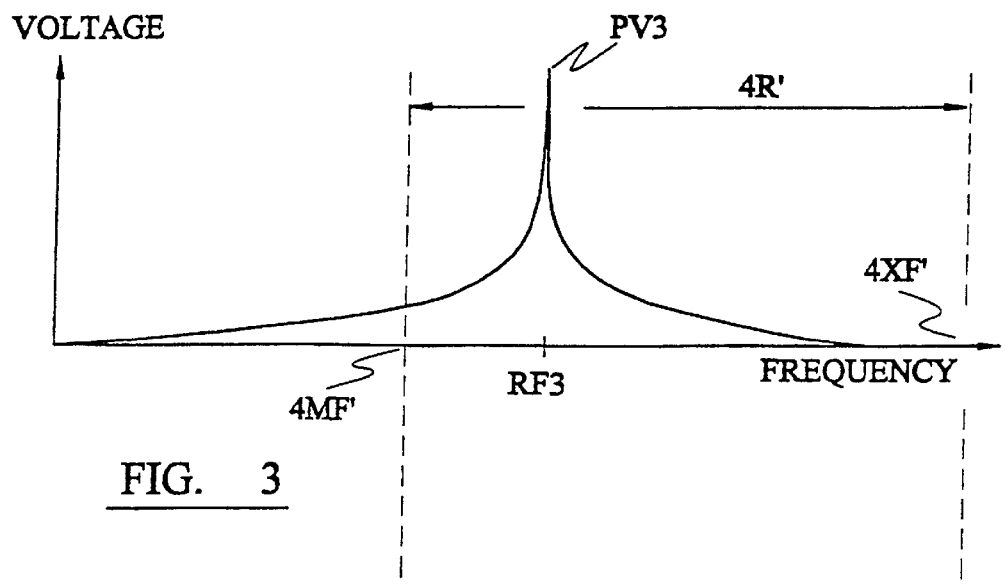
FIG. 3 is a graph showing a relationship between an open circuit lamp start voltage and frequency of an electrical supply across a lamp of the first embodiment shown in FIG. 1.

FIG. 3 shows a relationship between an open circuit lamp start voltage versus a frequency of the lamp start voltage. It may be seen that at a resonant frequency RF3 of inductor 11 and capacitor 13 of FIG. 1 a high peak voltage PV3 is generated. This voltage is arranged to be sufficient to cause the lamp 16 to begin to conduct. The resonant frequency RF3 is within the operating frequency range 4R' between 4MF' and 4XF', which are the same as the frequencies 4MF and 4XF and range 4F described below.

Figure 4:
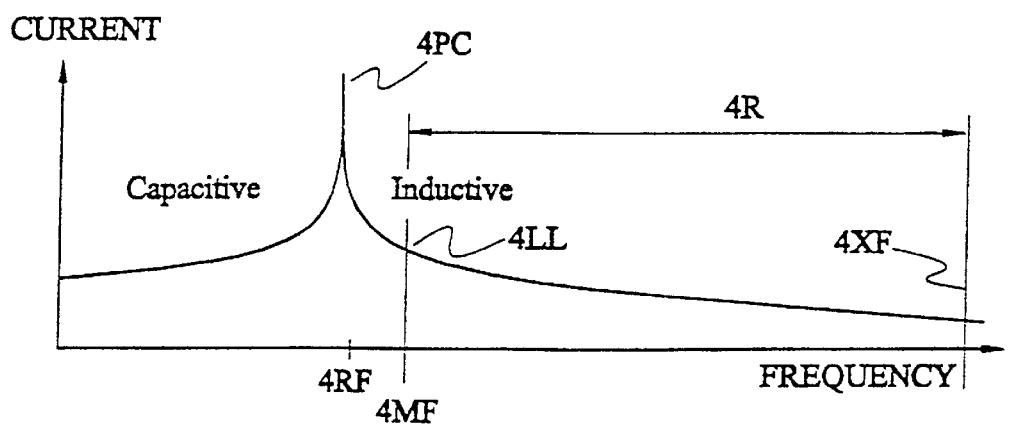
FIG. 4 is a graph showing a relationship between current through a lamp and the frequency of the electrical supply to the lamp of the first embodiment shown in FIG. 1.

FIG. 4 is a graph showing a relationship between running current through the lamp 16 and the frequency of the electrical supply from the signal generator 10 shown in FIG. 1. It may be seen that at the resonant frequency 4RF of inductor 11 and capacitor 12 a high resonant current 4PC is generated. To ensure that the current through the lamp may be controlled, the signal generator is arranged to operate over a frequency range 4R above a minimum frequency 4MF which is 400 kHz or above and below a maximum frequency 4XF. Using currently available commercial components the maximum frequency currently available is limited to about 500 kHz, but higher maximum frequencies would provide additional benefits relating to safety and operation described below.

Figure 5:
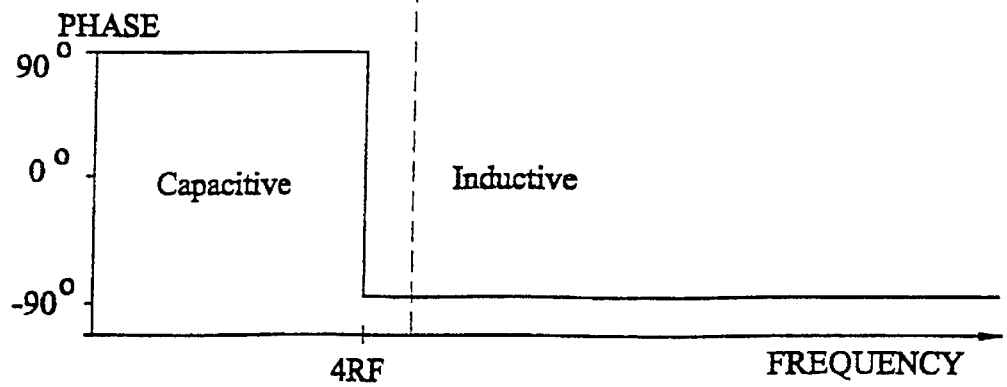
FIG. 5 is a graph showing a phase angle relationship between a running current through a lamp and the frequency of this electrical output from the signal generator of the first embodiment shown in FIG. 1.

FIG. 5 is a graph showing a phase angle relationship between a running current 1RC through a lamp 16 and the frequency of this electrical output from the signal generator 10 as shown in FIG. 1. It may be seen from FIG. 5 how the load on the output of the signal generator becomes inductive above the resonant frequency of the inductor 11 and the capacitor 12. The operation of the signal generator may be made more efficient by operating in the inductive part of this graph, as is described with reference to FIG. 2.

The value of 13 is chosen such that series resonance between 11 and 13 occurs at some series resonant frequency RF3 (of FIG. 3) within the frequency range 4R' of the signal generator 10, but above the series resonant frequency 4RF (of FIG. 4) of 11 and 12.

Prior to ignition of the lamp the lamp will behave substantially as an open circuit so that no load is presented to the network of 11, 12 and 13.

The frequency of the signal generator is arranged to be reduced until its output frequency corresponds to the above-mentioned series resonant frequency RF3 of 11 and 13. It is a characteristic of series resonant circuits that they exhibit low impedance at their resonant frequency. Thus a large current is driven, by the signal generator, through the series resonant circuit formed by 11 and 13. As the lamp is still an open circuit no current passes through it, or the series connected capacitor 12.

This large resonant current flows through capacitor 13, which has finite impedance. As a result of the finite impedance of capacitor 13 and the large current flowing through it, a high voltage PV3 is developed across capacitor 13. Preferably the high voltage PV3 is in a range between 500 volts and 50,000 volts. More preferably for HID lamps the high voltage PV3 would be between 2,000 volts and 5,000 volts. The lamp is connected in parallel with capacitor 13 and as a result of the high voltage present across the lamp, a gas in the lamp breaks down and enters a glow mode of operation. The lamp now no longer represents an open circuit and, as a consequence, current begins to flow through the lamp. The lamp voltage in this glow mode falls rapidly from the open circuit value (2–5 kV) to a very much lower voltage of some 200–300 volts. Eventually the power being dissipated in the lamp causes the lamp to transition from the glow to the arc mode of operation. The low impedance of the running lamp now shunts the capacitor 13. The resonant action of capacitor 13 and 11 is highly damped as a result. The extent of the damping is such that the presence of capacitor 13 can be largely ignored once the lamp is running. When the lamp is running in a steady state it is lit and producing light in an efficient manner.

Figure 6:
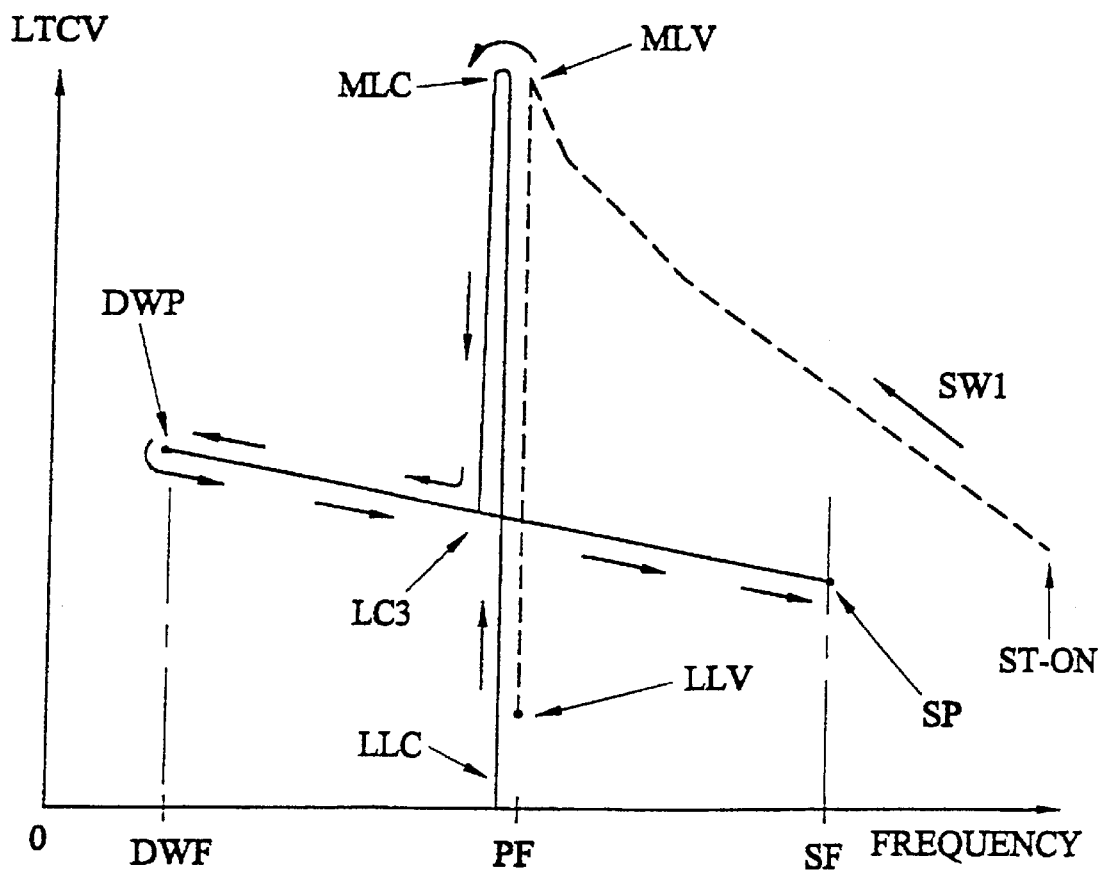
FIG. 6 is a is a graph of a relationship between a voltage across a lamp of the embodiment shown in FIG. 1 before it is lit and up to the instant that it is lit with the frequency of an electrical supply across the lamp, and of a relationship between the said frequency and a current through the lamp from the instant it is lit and begins to conduct.

Such a variation of voltage and current with frequency as the lamp is switched on and starts to become lit and continues lit can be seen from FIG. 6. In FIG. 6 a combined graph of both voltage and current LTCV is plotted against frequency FREQ. Such a graph may be obtained from a circuit such as that shown in FIG. 1. Such a circuit may be arranged to comprise a variable frequency generator. In operation when the circuit of FIG. 1 is switched on the variable frequency generator may be preferably arranged so that it starts operation at a high frequency at a start point ST-ON. The variable frequency generator may be arranged to then reduce the frequency so that a voltage measured across terminals of a lamp follows the arrow SW1. The voltage rises to a maximum lamp voltage MLV at a particular frequency PF at which point the lamp resistance breaks down and the lamp suddenly begins to conduct. The voltage across the lamp immediately collapses from the maximum lamp voltage value MLV to a low value LLV. The voltage is no longer shown on this graph, as it now varies with time rather than with frequency. However, a lamp current LLC begins to flow through the lamp at the instant the lamp begins to conduct. Note that for clarity there is a gap shown on the graph. The lamp current rises substantially instantaneously to a maximum value MLC and then falls rapidly to a point LC3 as the variable frequency generator continues to reduce the frequency of the voltage across the lamp. As the frequency continues to fall the current rises to a second maximum at a dwell point DWP. Preferably the variable frequency generator is arranged to dwell for a considerably longer period than a sweep time that has elapsed between the start point ST-ON and the dwell point DWP. A benefit of the dwell period is that the discharge in the lamp is allowed to stabilise at the higher second maximum current before the variable frequency generator reduces the frequency to a sustained operation point SP. When the variable frequency generator is operating at the sustained operation point frequency SF the lamp is operating so as to produce light in an efficient manner.

It is advantageous, in order to prolong lamp life, to ensure that the lamp spends as little time as possible in the glow mode of operation. Preferably the values chosen for 11 and 12, such as those given in Table 1, in conjunction with other design features present in a practical embodiment of the ballast invention, provide for a high current to be driven through the lamp whilst it is in the glow mode. A benefit of this is that the glow to arc transition period is minimised.

Once the arc mode has become established the lamp presents low impedance to the passage of current through it. Initially, at start up, this impedance will be very low. As the lamp warms up towards its final operating temperature, the pressure of the lamp fill increases. This brings about corresponding increases in lamp impedance and lamp voltage during the warm up period.

As the current flowing through the lamp is determined primarily by the series reactance of 11 and 12 and the frequency of the signal generator, the frequency of the generator may be adjusted to a minimum value so as to obtain appropriate values of run up current and then adjusted to provide a required steady state lamp current.

It will be noted that, when the lamp is running, lamp current flows through the series connected components 11 and 12. Dependent upon the frequency of operation chosen, three distinct modes of circuit operation exist.

FIGS. 4 and 5 show graphically the lamp current, frequency and phase angle considerations These three distinct modes are:
1. Where the operating frequency is above the series resonant frequency of 11 and 12, the current drawn from the signal generator will lag the signal generator voltage by some phase angle, i.e. the signal generator sees an inductive load.
2. Where the operating frequency is below the series resonant frequency of 11 and 12, the current drawn from the signal generator will lead the signal generator voltage by some phase angle, i.e. the signal generator will see a capacitive load.
3. Where the operating frequency is set at the series resonant frequency of 11 and 12 the lamp current will be essentially unlimited, as the overall impedance of the supply circuit formed by the signal generator and the components 11 and 12 will be at a minimum. The signal generator will see an essentially resistive load in this mode of operation.

Clearly the third mode of operation is not directly useful, since it is the object of any practical ballast to limit lamp current to some known and controllable value. Limiting the output frequency range of the signal generator is a practical means of ensuring that lamp operation is only possible at frequencies usefully above the series resonant frequency of 11 and 12, that is operation preferably is constrained to mode 1.

By so limiting the output frequency range of the signal generator to frequencies above the series resonant frequency of 11 and 12, it is ensured that:
1. Lamp current is controllable and follows some inverse function of signal generator frequency.
2. The signal generator is caused only to operate with an inductive load present at its output.

Both of these conditions are met in, but are not necessary to, a practical embodiment of the invention, which utilises frequency control as the primary means of regulating lamp current (and therefore lamp power) to some chosen value.

It should also be noted, as a benefit, that any DC component of voltage present at the output of the signal generator will be blocked from reaching the lamp by the action of the capacitor 12. In addition any tendency of the lamp to act as a rectifier will not result in a DC component of current flowing in the lamp. A benefit of this feature is that of preventing premature lamp failure or damage to the ballast circuit.

A further benefit of capacitor 12 and the high frequency being above 400 kHz, is that the value of capacitor 12 is sufficiently small to prevent a hazard from a supply frequency current that could otherwise be present at lampholder terminals that is the points 14 and 15. Preferably the maximum current at the supply frequency is below a value which would present a hazard to persons who might come into contact with the lamp terminals. Preferably this value is less than 30 mA, and more preferably less than 5 mA.

A fourth embodiment of the invention will now be described in detail with reference to the circuit diagram given as FIG. 2, and the following Table 2 which gives suitable values for the components shown in FIG. 2 for a particular example of the fourth embodiment arranged to power a 70 W high intensity discharge lamp, such as a Philips MASTERCOLOUR CDM-T (Registered Trademark) or a GE ARCSTREAM (Registered Trademark).

TABLE 2

| Symbol | Value/Reference | Symbol | Value/Reference |
|---|---|---|---|
| D1 | BAS216 | Q1 | BC849 |
| D2 | BAS216 | Q2 | BC849 |
| D3 | BAS216 | Q3 | FMMT720 |
| D4 | BAS216 | Q4 | FMMT720 |
| D5 | RB160L-40 | Q5 | IRML2803 |
| D6 | RB160L-40 | Q6 | IRF840 |
| D7 | RB160L-40 | Q7 | IRF840 |
| D8 | BAS216 | U1 | UC3861N |
| D9 | RB160L-40 | T1 | 10:1 AUX POWER TRANSFORMER |
| D10 | RB160L-40 | | |
| D11 | RB160L-40 | T2 | 36:1 CURRENT TRANSFORMER |
| D12 | RB160L-40 | | |
| D13 | BAS216 | T3 | 7:11 GATE DRIVE TRANSFORMER |
| D14 | BAS216 | | |
| D15 | UF5404 | L | 76 MICROHENRY OUTPUT INDUCTOR |
| D16 | UF5404 | | |
| D17 | UF5408 | L1 | 20 MH COMMON MODE INDUCTOR |
| D18 | UF5408 | | |
| D19 | UF4006 | C1 | 10 nF |
| D20 | UF4006 | C2 | 10 nF |
| D21 | BAS216 | C3 | 100 nF |
| D22 | BAS216 | C4 | 100 nF |
| D23 | 15 V ZENER | C5 | 12 pF |
| BR1 | 4A 600 V BRIDGE RECTIFIER | C6 | 100 nF |
| | | C7 | 10 nF |
| R1 | 10 kΩ | C8 | 220 pF |
| R2 | 10 kΩ | C9 | 100 nF |
| R3 | 10 kΩ | C10 | 100 nF |
| R4 | 18 kΩ | C11 | 100 nF |
| R5 | 100 kΩ | C12 | 100 nF |
| R6 | 100 kΩ | C13 | 100 nF |
| R7 | 3.9 kΩ | C14 | 3.3 pF |
| R8 | 22 kΩ | C15 | 470 pF/1 kV |
| R9 | 22 kΩ | C16 | 470 pF/1 kV |
| R10 | 1 MΩ | C19 | 220 pF |
| R11 | 1 MΩ | C20 | 220 μF/200 V |
| R12 | 18 kΩ | C21 | 220 μF/200 V |
| R13 | 15 Ω | C22 | 220 nF/250 VAC |
| R14 | 10 Ω | C23 | 220 nF/250 VAC |
| R15 | 15 Ω | C24 | 470 μF/25 V |
| R16 | 15 Ω | C | 11 nF/1 kV |
| R17 | 47 Ω | CIGN | 1.5 nF/6 kV |
| R18 | 47 Ω | | |
| R19 | 47 Ω | | |
| R20 | 827 kΩ | | |
| R21 | 1 MΩ | | |
| R22 | 180 kΩ | | |
| SR1 | 20 ΩNTC | | |

Figure 2:
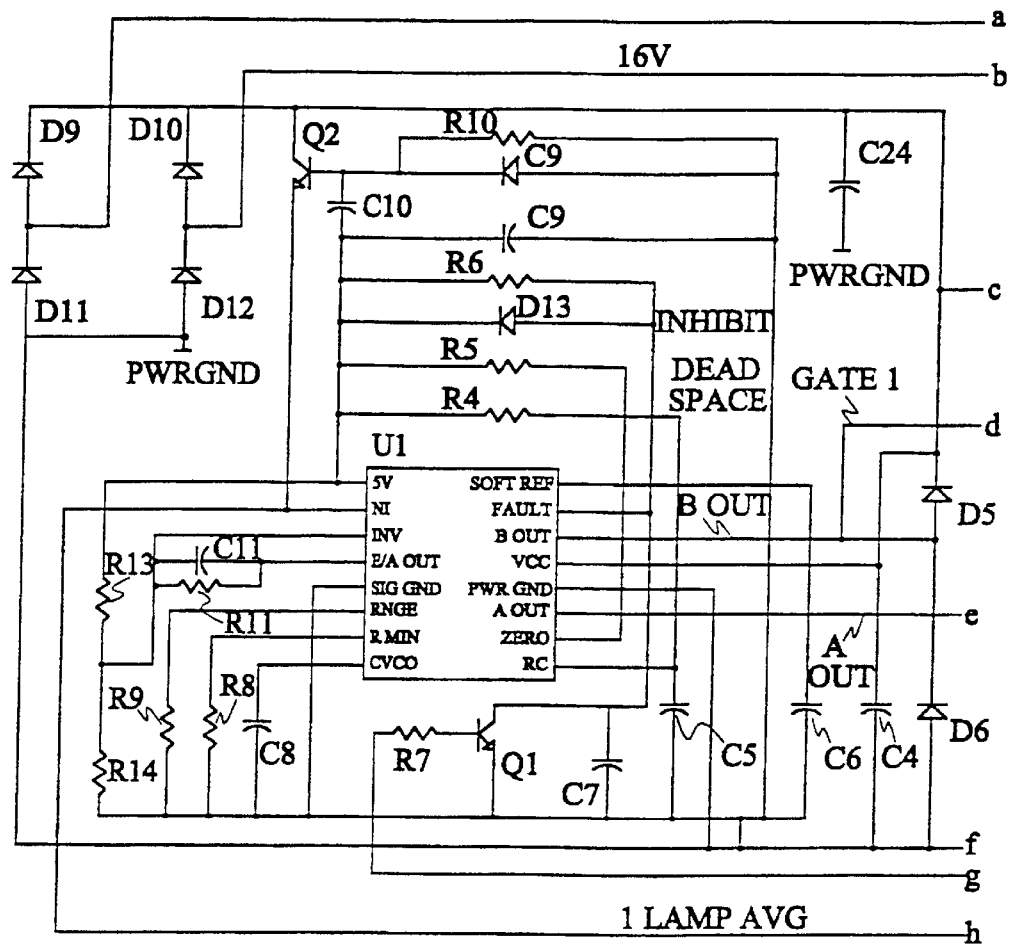
FIG. 2 is a circuit diagram of an electronic ballast according to a fourth embodiment of the invention.
Figure 2:
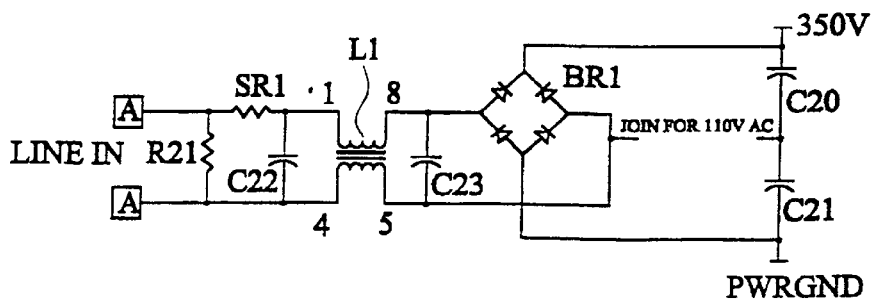
Figure 2:
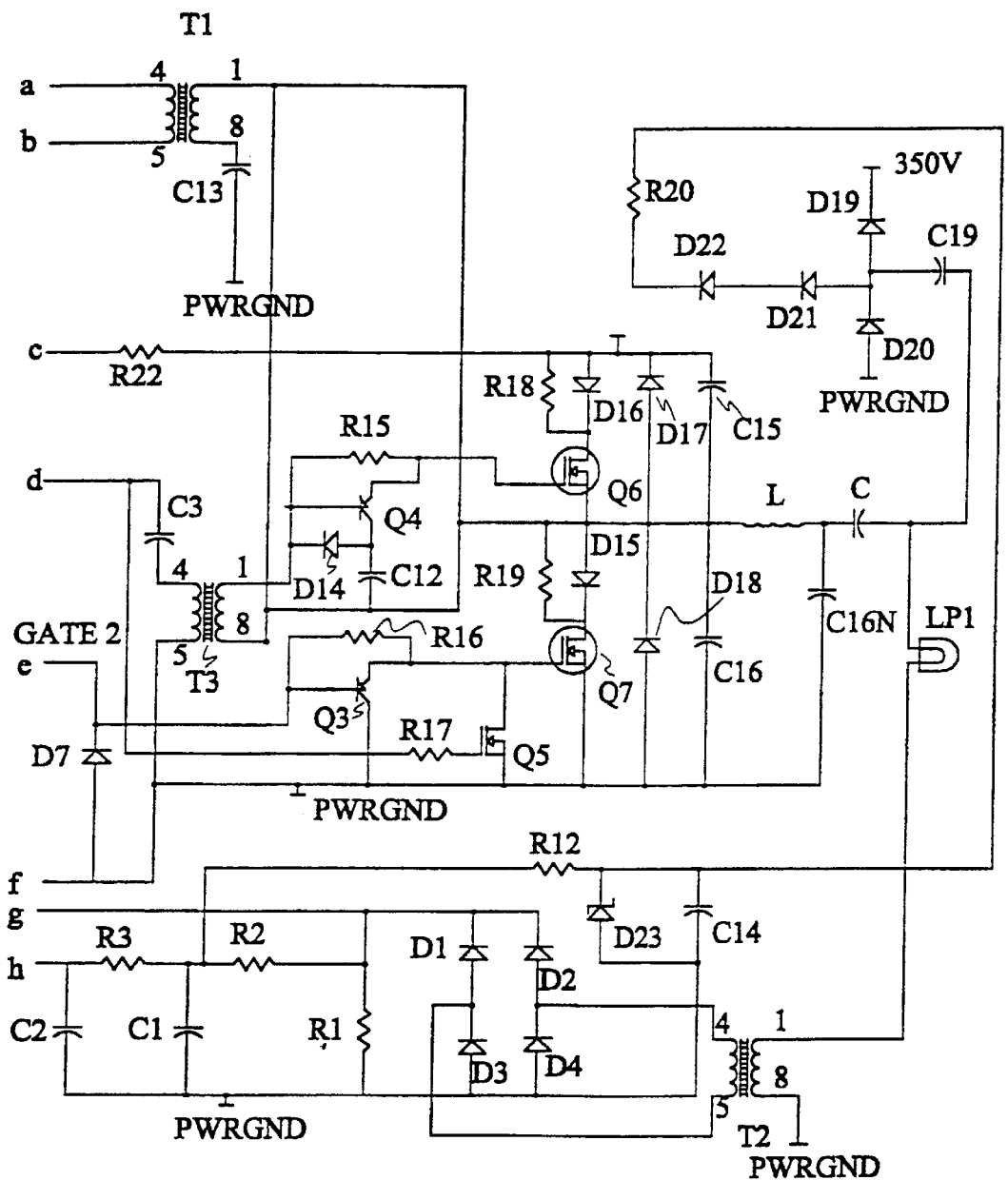

All resistors 1%
All capacitors 5% voltage rating 25 vdc rating except as stated According to FIG. 2 the power supply means to the invention is rectified and smoothed line frequency current at a supply voltage of 230 vac (volts alternating current) (although the embodiment could also be arranged to work from a different voltage supply or from a direct current supply).

Components SR1, C22, L1, & C23 form a filter network that prevents high frequency interference currents generated by the circuit travelling back into the power line. BR1 is a full wave bridge rectifier and C20 and C21 are energy storing smoothing components.

This method of obtaining direct current from the power line is known to draw undesirable harmonic currents from the power line. The circuit stages involved namely BR1, a full wave bridge rectifier, and C20 and C22 the energy storing smoothing components may be replaced by an "Active Power Factor Correction" circuit in order to overcome the above mentioned disadvantage. Such Active Power Factor Correction circuits are well known and documented in the art and may be employed without detriment to the function of the invention.

Rectified and smoothed line power is thus available at a voltage typically of 350 volts dc. This is the primary source of power for the embodiment to be described and will, for simplicity, be referred to as the 350-volt rail.

The 350 volt rail is connected and provides power to a zero voltage switching half bridge inverter circuit comprising Q6, Q7, D15, D16, D17, D18, C17 & C18. This inverter circuit supplies high frequency ac power to the lamp via 11 and 12. An ignition capacitor 13 is provided. (The general functions of 11, 12 and 13 correspond with 11, 12, and 13 in the description given above with respect to FIG. 1.)

The operation of the half bridge inverter circuit will now be described with reference to FIG. 2.

Transformer T3 in the circuit diagram performs the level shifting required to operate the gate of the "high side transistor Q6. Components Q4, R15, D14 and C12 enhance the gate discharge current available to Q6, whilst Q3, R16, R17 & Q5 enhance the gate discharge current available to Q7.

The driving waveforms thus made available to the power switching elements Q6 & Q7 are arranged so as to be in anti-phase thus Q6 is driven on whilst Q7 is biased off and vice-versa. Moreover the drive waveform provides for a dead space i.e. a small period of time between the commutation of the conduction period of one transistor and the onset of conduction of the other transistor.

Figure 7:
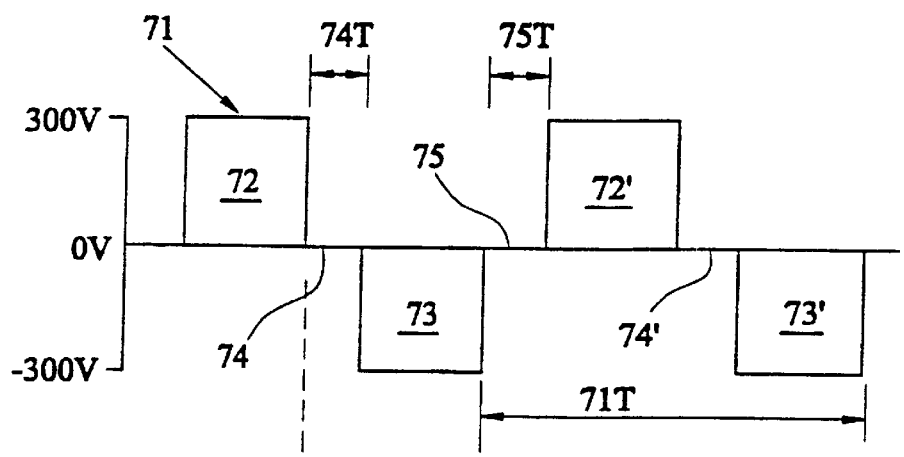
FIG. 7 is a graph of a driving waveform for the output transistors for the embodiment shown in FIG. 2.

From FIG. 7, a graph of such a driving waveform for the output transistors, the power switching elements Q6 and Q7, for the embodiment shown in FIG. 2 may be seen with the voltage on the vertical axis and time on the horizontal axis. The driving waveform 71 comprises a square wave positive pulse 72 and a negative pulse 73, separated by a zero voltage dead space 74, the negative pulse followed by a second dead space 75. This is then repeated at a time interval of 71 T such that the frequency of the waveform is greater than 400 kHz. The dead spaces have a time interval of 74 T and 75 T respectively, and preferably this time interval is such that the output transistors have sufficient time to cease conducting, and also that the energy stored in the reactance of the output circuit is sufficient to reverse the potential of the output side of the output transistors so that they do not have to switch any voltage.

In the embodiment of FIG. 2, 300 nS has been found to be an acceptable time interval for the dead spaces 74 T and 75 T with a whole cycle time interval 71 T of 2 μS at 500 kHz.

Figure 8:
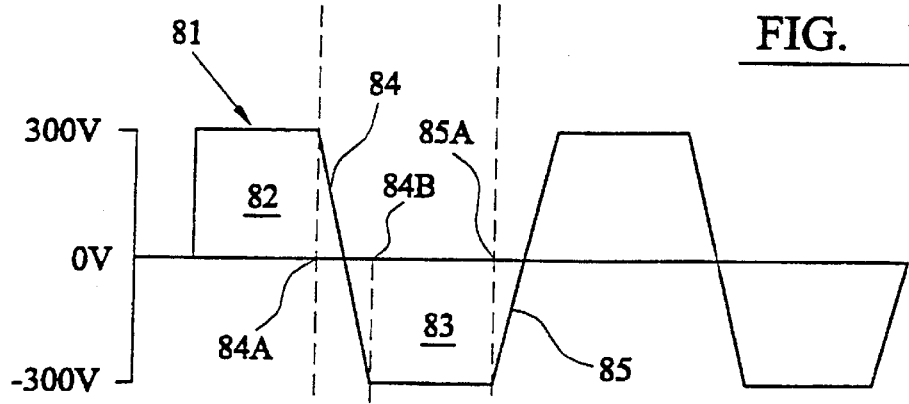
FIG. 8 shows an output waveform of the power output to the lamp at a preferred operating condition.

FIG. 8 shows an output waveform 81 of the power output to the lamp LP1 of FIG. 2 at a preferred operating condition. The preferred operating condition is such that when the first output transistor ceases to be driven at 84A, the stored energy in the output reactance L and C of FIG. 2 is sufficient to produce the voltage change shown by line 84, such that at time 84B the voltage has reversed completely and the second transistor begins to conduct to maintain the negative pulse until time 85A when the reactance again drives the voltage up line 85.

Figure 8A:
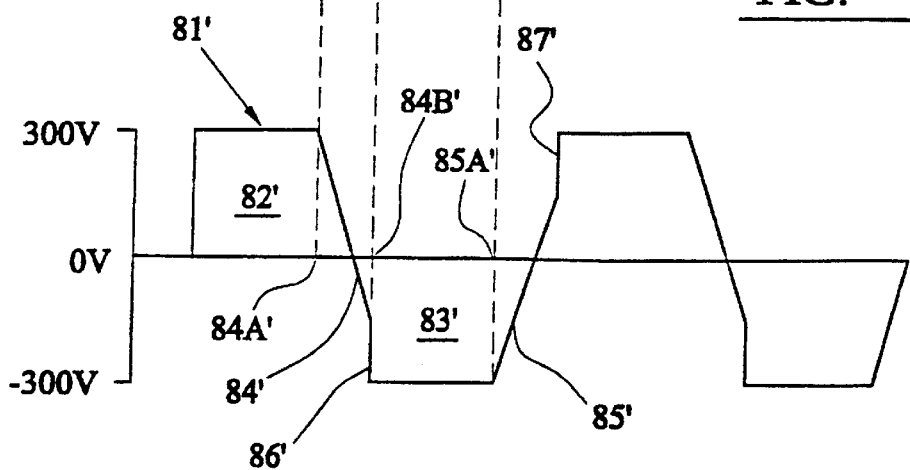
FIG. 8A shows an output waveform similar to FIG. 8, but at a non-preferred operating condition and resulting from the driving waveform of FIG. 7.

FIG. 8A shows an output waveform 81' similar to FIG. 8, but at a non-preferred operating condition and resulting from the driving waveform of FIG. 7. The non-preferred operating condition is such that when the first output transistor ceases to be driven at 84A', the stored energy in the output reactance L and C of FIG. 2 is insufficient to produce the preferred voltage change, and can only produce the voltage change shown by line 84', such that at time 84B' the voltage has not reversed completely and when the second transistor begins to conduct to maintain the negative pulse it has to increase the output potential by a step change 86', when it maintain the voltage until time 85A' when the reactance again drives the voltage up line 85'. Again this is insufficient to completely reverse the voltage and the first transistor has to increase the output voltage by a step change 87'. These step changes in voltage are undesirable.

Figure 9:
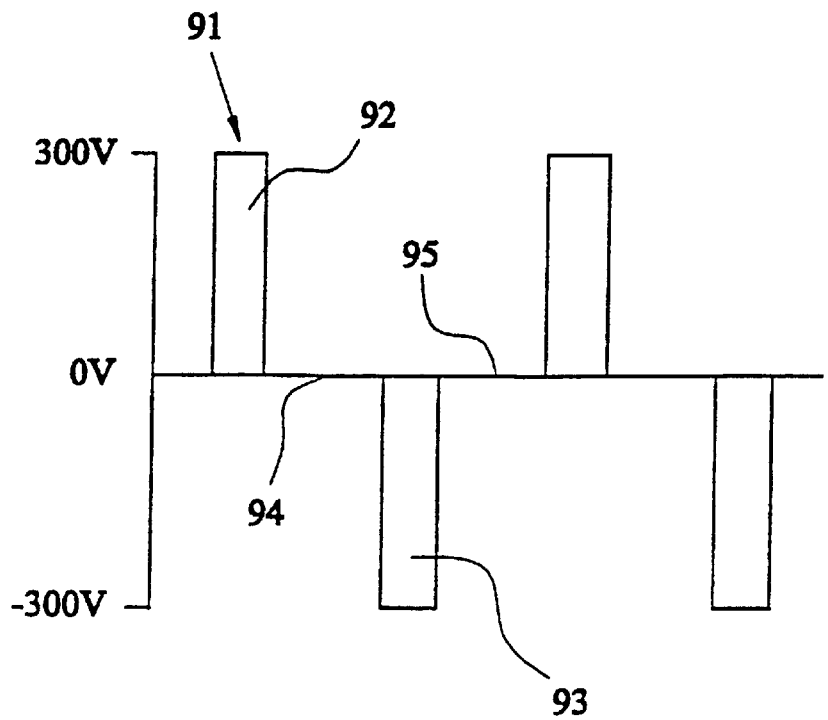
FIG. 9 is a graph of a driving waveform for the output transistors for the embodiment shown in FIG. 2 at a higher frequency.
Figure 9A:
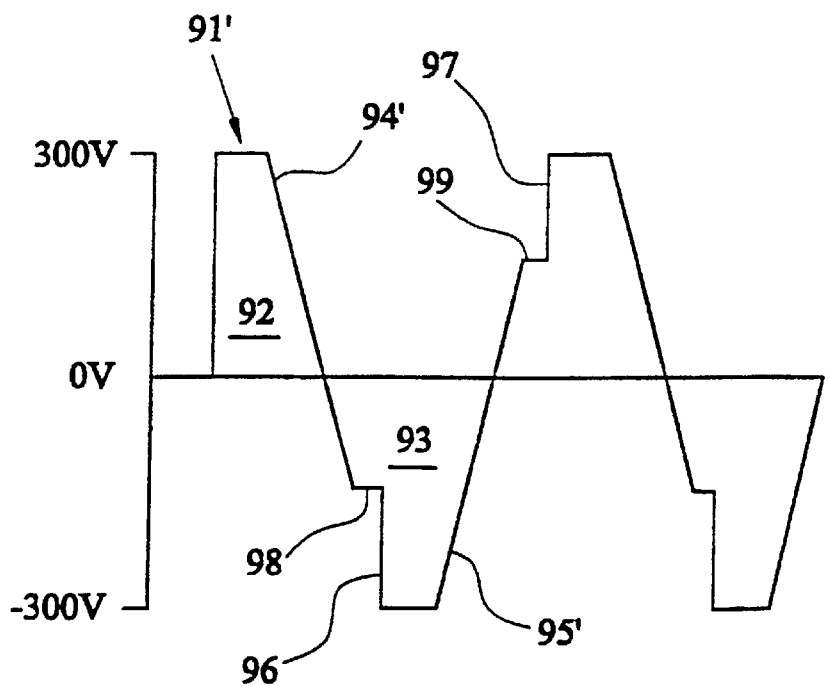
FIG. 9A is a graph of an output waveform resulting from the driving waveform of FIG. 9.

FIG. 9 is a graph of a driving waveform 91 for the output transistors for the embodiment shown in FIG. 2 at a higher frequency and show how the dead space time intervals 94 and 95 must remain: the same at 300 nS to allow the transistors to switch completely. However, from FIG. 9A which is a graph of an output waveform 91' resulting from the driving waveform 91 of FIG. 9, it maybe seen that due to the increased frequency there is no longer sufficient energy in the output pulses 92 and 93 to enable the output reactance to store sufficient energy to completely reverse the voltage. Hence the voltage change 94' reaches a steady state voltage at 98 before the output transistor is driven, and hence the output transistor has to increase the output voltage by step change 96. Similarly in the second half of the cycle, the voltage change 95' reaches a steady state voltage at 99 before the output transistor is driven, and hence the output transistor has to increase the output voltage by step change 97.

This dead space serves two functions, the first is to ensure that Q6 & Q7 cannot conduct simultaneously and the second is to provide a time interval for the resonant transition of current from one transistor to the other.

This resonant transition of current may provide considerable benefit to the electrical efficiency of the circuit, since by this means the considerable switching losses that normally occur in such a circuit are avoided altogether.

The operation of this feature will now be described by comparison with a circuit that does not support resonant transition switching.

In a conventional inverter the power switching elements are not equipped with parallel capacitors C15 & C16. When one or other device commutates current, such current continues to flow in the device for a period of time known as the "fall time". During such fall time the device supports simultaneously a high current and voltage which leads to high power dissipation during the commutation event. When the commutation events occur at high frequencies, such as is the case in the present invention, considerable power is lost. This loss is commonly referred to as switching loss.

The introduction of C15 & C16 into the circuit can under certain operating conditions, completely eliminate this switching loss. The important conditions are:

1. That a dead space is provided by the driving circuit waveforms.
2. That the load driven by the inverter is inductive in nature and is of a certain minimum current.

As has already been stated a simple constraint in the operating frequency range will ensure that the operating frequency lies above the resonant frequency of 11 and 12 so that the inverter always drives an inductive load during lamp operation. The above conditions are therefore met in this embodiment of the present invention.

In the resonant transition variant of the half bridge inverter capacitors C15 & C16 provide an alternative pathway for the inductive current normally commutated by the power switching elements. When for example the driving waveform for the gate of Q7 goes to the low state Q7 ceases to conduct. Current continues to flow through the inductor 11 however, so that the current, which was flowing in Q7 now commutates without loss into the capacitor C16. The direction of current flow is such as to charge C16 resonantly towards the upper 350-volt supply rail.

Sufficient time must be allowed in the dead space for this charging process to occur. The components C5 & R4 set the dead space period by way of a monostable internal to the control IC.

The energy required to charge C16 in this manner is derived from energy stored in inductor 11. However inductor 11 stores more energy than is required to charge C16 to a voltage equal to the upper supply rail.

This additional energy is returned to the supply rail via D17. D17 is in anti-parallel to Q6 and serves in conjunction with D 16 to prevent the flow of current in the "body Diode" of Q6.

Exactly the same process occurs when Q6 commutates current into C15 during the opposite half cycle of inverter operation.

The body diodes of power mosfet transistors have long reverse recovery times that lead to poor high frequency performance and device failure if the inverter circuit feeds capacitive loads. If the load is capacitive, for any reason, then the body diode of one device can be conducting when the opposite device is turned on. This event causes very high currents to flow in both devices for the duration of the body diode reverse recovery period.

Although operation of the inverter is always into an inductive load, if the lamp is running, capacitive loads can be present during lamp ignition so that D15, D16, D17 & D18 are provided to eliminate the possibility of catastrophic transistor failures during lamp ignition.

Driving waveforms for the two inverter transistors Q6 & Q7 are preferably derived from a control IC available on the market, and manufactured by Unitrode Inc. of USA Type UC3861.

This IC performs a number of functions useful to the invention, although these functions may equally well be obtained from an alternative suitable circuit arrangement. The IC may be made sensitive to the prevailing lamp and supply conditions and can therefore be used to control the half bridge inverter circuit so as to start lamps, limit the range of operating frequencies, and to regulate the power of running lamps. The manner, in which one embodiment of the invention utilises the control IC will now be described with reference to FIG. 2.

Operating power for the control IC, U1, is derived from two sources, one source is utilised during circuit start up and relies upon a particular characteristic of the control IC. The other source is used to supply power to the IC in steady state operation with a running lamp. In this way a useful mode of lamp ignition is ultimately obtained.

The IC characteristic mentioned above is known as Under Voltage Lock Out (UVLO) which prevents operation of the IC when the supply voltage to the IC is too low for proper operation. When the IC is in the under voltage condition it is said to be below the UVLO start threshold. In this mode The IC draws a very low current from its supply.

Accordingly a high value of resistance from the 350-volt rail (R22 in FIG. 2) will supply sufficient current to charge C24 to the upper UVLO threshold. (C24 is connected across the supply pins of the control IC). Once the upper UVLO threshold of the control IC has been reached the IC will become operational and draw a high current from the capacitor C24.

This capacitor is sized such that sufficient energy is stored in it to allow operation of the IC for some 20 ms. During this period of operation the outputs of the IC will become active and drive the gates of the inverter transistors Q6 & Q7. Once the inverter has become active a small auxiliary transformer T1 has its primary energised via a coupling capacitor C13. This transformer T1 has a 10:1 reduction ratio and its secondary is full wave rectified by D9, D10, D11, & D12. The rectified output is applied across C24 so as to maintain a continuous supply of power to the control IC.

At the moment of power up the 5-volt reference pin of the IC becomes active and rapidly transitions between 0 and 5 v. This transition is capacitively coupled to the base of emitter follower Q2 via C10 so that the emitter of Q2 moves to an initial voltage of approximately 4.3 volts. As C10 charges the emitter voltage of Q2 falls towards 0 volts. The time constant of this circuit is set by R10. D8 ensures that C10 is immediately discharged if the 5 volt output of the control IC falls to zero. D8 thus provides a means of resetting C10.

The action of this part of the circuit is such as to force the voltage-controlled oscillator (VCO) internal to the IC to run at its maximum programmed frequency on power up. As C10 charges and the voltage on the emitter of Q2 falls the VCO frequency falls towards the minimum programmed frequency. C8, R8 & R9 conveniently program the maximum and minimum frequencies of the VCO.

The output of the VCO is internally divided by two and used as a clock for the IC outputs, so the overall effect of this sub-circuit is to cause the inverter output to sweep between a maximum and a minimum frequency at power up. The rate of this sweep is defined ultimately by the time constant of C10 and R10.

During this power-up frequency sweep at a particular frequency PF a series resonance of 11 and 13 will be excited, producing a burst of high voltage at the particular frequency PF across the lamp terminals, thereby breaking the lamp down into the glow mode of operation. The output frequency of the inverter will continue to fall rapidly to the minimum programmed frequency. This will minimise the reactance in series with the lamp thereby maximising lamp current, so as to ensure a rapid glow to arc transition. This sequence may be seen from FIG. 6, as described above.

Should the lamp fail to light, a time-out circuit comprising C7 & R6 will cause the control IC to shut down its outputs thus inhibiting the inverter activity. The time constant of C7 & R6 is preferably made small so as to limit operation of the inverter to a short period of time in this "ignition" mode. Preferably the short period of time is less than 10 seconds, and more preferably less than 500 milli-seconds, and still more preferably to less than 100 ms.

This short period of time minimises the exposure of the inverter transistors to the high dissipation conditions that exist if the inverter is allowed to run continuously without a lamp load. Under these conditions the inverter would be driving a capacitive load with consequent high switching losses.

As soon as the action of the time out circuit has inhibited inverter operation the auxiliary transformer T1 is deprived of power, so that this source of supply power to the control IC is removed. The current flowing through R22 alone cannot sustain operation of the IC, so that capacitor C24 becomes discharged. Once the voltage on C24 falls below the lower UVLO threshold the IC will revert to its low power mode and the charge cycle of C24 begins once more, leading to another power up ignition sequence. This process will continue until the lamp eventually lights, or mains power is removed from the ballast.

This process provides an automatic means of lighting lamps which have become too hot to start as a result of a previous period of normal operation, without wasting power in the ballast. Hot lamps have increased lamp fill pressures, which can elevate the voltages required for lamp ignition to undesirably high levels.

If the attempt to light the lamp was successful, lamp current flowing through the primary of the lamp current sense transformer T2 causes a scalar current to flow in the secondary of T2. This secondary current is full wave rectified by D1, D2, D3 & D4. This rectified current produces a voltage drop across R1, the current sense resistor. This voltage is proportional, therefore, to the lamp current. This voltage is applied to the base of Q1 via R7 so that if the lamp has started the time out circuit of C7 & R6 is defeated by the action of Q1 and continuous operation of the circuit is allowed.

Once continuous operation has become established the function of the control IC becomes that of regulating lamp current and power.

In order to regulate lamp power both lamp current and lamp voltage must be sensed. Lamp current sensing is by way of the current sense transformer T2 and the above mentioned current sense resistor.

Averaging components R2, C1, R3 and C2 present a signal (I lamp average) to the control IC which is proportional to the lamp current. An operational amplifier internal to the control IC compares this signal with a set point established by R13 & R14. In this way the lamp current signal causes the frequency of the VCO to be increased or decreased in order to maintain the set point current. Components C11 & R11 are used to tailor the frequency response of the operational amplifier so as to maintain loop stability under all operating conditions.

Holding lamp current constant in this way would take no account of the lamp power variations caused by lamp voltage changes. Lamp power would be proportional to lamp voltage. Accordingly the lamp voltage is sensed and averaged by components C19, D21, D22, R20, C14, & D23. Components D19 & D20 limit the lamp voltages sensed, so as to prevent false operation during lamp ignition.

The signal thus derived is proportional to lamp voltage and is resistively summed with the average lamp current signal presented to the control IC via R12. In this way the actual lamp current set point is reduced according to increased lamp voltage, so as to obtain constant lamp power operation over the anticipated range of lamp voltages. This method is well known in the art and is referred to as "linear Interpolation".

Over the normal range of lamp voltages, lamp power will be held substantially constant by the use of this control method. If however the lamp voltage falls outside of the normal range, lamp power will deviate significantly from the nominal value. In a preferred embodiment of the invention, the lamp voltage and current signals are summed in such a way as to reduce lamp power if the lamp voltage falls outside of the normal operating range.

It is a characteristic of high intensity discharge lamps that, at end of lamp life, lamp voltage will deviate considerably from normal values. If the electrodes of the lamp have become eroded, for example as a result of extended operation, the lamp voltage will be increased as a function of the increased length of the arc discharge within the lamp. If the arc tube has developed a leak, or if lamp fill has been lost by some other mechanism, the lamp voltage will fall as a function of the reduced fill pressure within the lamp.

One disadvantage of high intensity discharge lamps is the risk of explosive lamp failure arising as a consequence of their high operating temperatures and pressures. The risk of this type of failure increases greatly if the lamp is operated beyond its rated life.

The risks of the lamp failing explosively in this way at the end of its rated lifetime are considerably diminished if the power supplied to the lamp is reduced. The action of the control method, which automatically reduces lamp power if lamp voltage falls outside of the normal range, is such as to reduce the risk of explosive lamp failure at end of lamp life.

Variations in the line power voltage have no effect on lamp power since the closed-loop feedback described above automatically compensates for such variations by adjusting the frequency of the inverter circuit so as to hold lamp power constant.

The response time of the operational amplifier internal to the control IC and associated external components is such as to allow the circuit to respond to the ripple voltages present on C20 & C21 which will be at twice the power line frequency.

The effect of this ripple voltage on lamp power is also therefore eliminated and any lamp power variations occurring at the second harmonic of the power line frequency will be eliminated. Such lamp power variations can lead to visible lamp flicker, which is undesirable in many applications.

A further benefit arising from the above is that the inverter frequency becomes modulated as a function of the second harmonic of the power line frequency. This frequency modulation spreads the ballast operation over a range of frequencies. This reduces the instantaneous sub-harmonic energies available to excite acoustic resonance in lamps and improves lamp stability. This spread-spectrum operation also reduces radiated and conducted interference from the ballast, reducing the precautions needed to constrain such interference to acceptable levels.

FIG. 1A shows operation of a lamp from a ballast or a high power signal generator 10A of a second embodiment 1A of the invention. The generator has negligible internal impedance, produces a square wave voltage output of amplitude 350 volts, and has an output variable over a wide range of frequencies. The wide range of frequencies is preferably from 400–1,500 kHz. A high intensity discharge lamp is coupled to the generator via an inductor 11A, and a capacitor 12A. Ignition capacitor 13A is provided, in series with a switch 20A which is shown closed, but is arranged to open when the lamp 16A is disconnected from the joint control circuit 22A at disconnection points 14A and 15A. Lamp 16A comprises a sealed envelope 19A containing electrodes 17A and 18A arranged for an electrical discharge when the lamp is lit. In operation this circuit functions in a similar manner to the first embodiment described above, except that when the lamp 16A is disconnected from the signal generator, the switch 20A opens, hence capacitor 13A is no longer in a resonant circuit with inductor 11A, and hence the signal generator 10A is unable to produce the high ignition voltages that are required to start a lamp.

FIG. 1B shows operation of a lamp from a ballast or high power signal generator 10B of a third embodiment 1B of the invention. The generator has negligible internal impedance, produces a square wave voltage output of amplitude 350 volts, and has an output variable over a wide range of frequencies. The wide range of frequencies is preferably from 400–1,500 kHz. A high intensity discharge lamp is coupled to the generator via an inductor 11B, and a capacitor 12B. Ignition capacitors 13B and 21B provided, ignition capacitor 21B. In this embodiment switch 20B shown is omitted and the capacitor 21B is permanently connected in parallel with the lamp 16B. Hence when the lamp 16B is disconnected from the signal generator 10B at disconnection points 14B and 15B, the capacitor 21B is also disconnected from the signal generator. Lamp 16B comprises a sealed envelope 19B containing electrodes 17B and 18B arranged for an electrical discharge when the lamp is lit. In operation this circuit functions in a similar manner to the first embodiment described above, except that when the lamp 16B is disconnected from the joint control circuit, the capacitor 13B is no longer in a resonant circuit with inductor 11B, and hence the signal generator 10B is unable to produce the high ignition voltages that are required to start a lamp.

In an alternative embodiment to the third embodiment described above, the switch 20B may be inserted, and the lamp disconnection points arranged to be at the alternative locations 14B' and 15B'. Switch 20B being operable to an open state when the lamp 16B is disconnected from the ballast. Hence the operation of this circuit is similar to the fourth embodiment described above, in that when the lamp is disconnected from the ballast by disconnection at 14B' and 15B' the ignition capacitor 21B is removed from the resonant circuit and the signal generator 10B is not able to generate ignition voltages.

In the third embodiment of the invention the ignition capacitors 13B and 21B , resonate with the inductor 11 to provide the high voltages necessary for lamp starting. Ignition capacitor 21B may be situated separately or remotely from the ballast circuitry. As the capacitor is, in this embodiment of the invention, connected directly in parallel with the lamp 16B, no additional connections or wiring are required in order that this component can be situated at any advantageous location in the joint control circuit 22B between the ballast or signal generator 10B and the lamp 16B.

Preferably this capacitor is located in whole or in part, proximate to the lamp or is incorporated into the structure of the lamp, so that the following disadvantages that relate to discharge lamp operation may be reduced or eliminated.

These disadvantages, in part, relate to the safe operation of equipment that utilises discharge lamps. Such equipment normally makes use of a socket arrangement for connection of the discharge lamp in order to facilitate lamp changes. The high voltages normally generated during lamp starting can be hazardous, particularly in respect of operation with no lamp present in the lamp socket. The high starting voltages present at the receptacles of an exposed lamp socket give rise to the risks of, for example, electric shock.

If this capacitor is located in whole or in part in the structure of the lamp or its base, then the resonant action necessary for the generation of high lamp starting voltages cannot occur, unless a lamp possessing an appropriate value of parallel capacitance is properly fitted into the lamp socket. By this means greater safety is imparted in respect of operation with missing lamps.

Another disadvantage of known arrangements relates to the fact that discharge lamps are available with more than one power rating, but utilising the same base. As a result of this it is possible, for example to insert a low power, say 35 W lamp, into a socket that is intended for a 150 W lamp. As a result of this the 35 W lamp is grossly over powered and will almost certainly fail explosively within a few minutes of start-up.

In order to overcome this mismatching of lamps and sockets the fractional proportioning of the ignition capacitance between capacitor 13B that is permanently connected to the ballast circuit and the capacitor 21B that is disconnectable with the lamp may be made such as to prevent resonance occurring between high power ballasts and low power lamps. In this way low power lamps will not start when connected to ballasts intended for operating high power lamps, since the electrical conditions required for resonance will not be met. By this means of matching lamp reactive parameters to ballast reactive parameters improved safety and reliability are achieved.

A further advantage may be obtained if the capacitor 21B is thermally coupled to the lamp. It is well known that many types of discharge lamp cannot be restarted whilst they are hot. During a period of normal operation the lamp will become hot and cannot be restarted until it has cooled to a sufficiently low temperature. Any attempt to restart the lamp will be unsuccessful until the lamp has cooled to a temperature such that its starting voltage requirement has fallen within the capability of the ballast to provide a sufficient starting voltage.

It is the case therefore that the ballast may make a very high number of unsuccessful attempts to restart a hot lamp. These attempts represent unnecessary electrical stress throughout the system. It is normal practice in the industry to fit timer systems to overcome this difficulty.

If the capacitor 21B is thermally coupled to the lamp in such a way that capacitor temperature closely follows lamp temperature and the capacitor construction is such that it has a large negative temperature coefficient of its value, then the capacitance will fall in value with increasing lamp temperature.

If this decrease in capacitance is such as to prevent resonance occurring when lamps are too hot to restart, then the lamp (and capacitor) must cool sufficiently before resonance and lamp starting can occur.

By this means unnecessary and stressful attempts to start a hot lamp are automatically inhibited until the lamp has cooled to an appropriate degree.

What is claimed is:

1. A thermionic lighting system comprising:
   a high intensity discharge lamp,
   an electronic ballast having a regulated alternating current power output,
   a joint operating circuit included in and between the ballast and the lamp,
   the ballast having a variable frequency generator which is arranged to vary a frequency of the ballast output over a range of frequencies, with a minimum frequency of 400 kHz,
   the circuit having a reactance such that the circuit is arranged to be resonant to provide a starting voltage for the lamp at or above the minimum frequency.

2. The thermionic lighting system as claimed in claim 1 wherein the ballast is arranged to regulate the power output to the lamp by varying the frequency of the ballast output.

3. The thermionic lighting system as claimed in claim 1 wherein a maximum frequency of the range is such that the power output is sufficient to maintain operation of the lamp.

4. The thermionic lighting system as claimed in claim 1 wherein the range of frequencies is from 400 kHz to 1,500 kHz.

5. The thermionic lighting system as claimed in claim 3 wherein the ballast power output is regulated so that the output provides a constant power to the lamp when it is running in a steady state, and a higher current during a starting phase of the lamp.

6. The thermionic lighting system as claimed in claim 1 wherein the alternating current has a substantially sinusoidal waveform with a harmonic distortion of less than 40%.

7. The thermionic lighting system as claimed in claim 6 wherein the substantially sinusoidal waveform has a harmonic distortion of less than 15%.

8. The thermionic lighting system as claimed in claim 1 wherein the reactance comprises a series arrangement of an inductance and a capacitor where the output frequency and the value of the reactance is arranged so that the output frequency is above a resonant frequency of the reactance.

9. The thermionic lighting system as claimed in claim 8 wherein the ballast is arranged to provide the alternating current output by alternate switching of at least two inverter output transistors driven by means for providing a discontinuous alternating waveform, the waveform containing a period within every half cycle when neither output transistor conducts.

10. A thermionic lighting system comprising:
    a high intensity discharge lamp,
    an electronic ballast having a regulated alternating current power output,
    a joint operating circuit included in and between the ballast and the lamp,
    the ballast having a variable frequency generator which is arranged to vary a frequency of the ballast output over a range of frequencies, with a minimum frequency of 400 kHz,
    the circuit having a reactance such that the circuit is arranged to be resonant to provide a staring voltage for the lamp at or above the minimum frequency,
    wherein the reactance comprises a series arrangement of an inductance and a capacitor where the output frequency and the value of the reactance is arranged so that the output frequency is above a resonant frequency of the reactance, and
    the output power is arranged to pass through a capacitor in series with the lamp, the value of capacitance being sufficiently small to limit a current flow, through the lamp at a frequency of the electrical power input to the ballast, to less than 30 mA.

11. A thermionic lighting system comprising:
    a high intensity discharge lamp,
    an electronic ballast having a regulated alternating current power output,
    a joint operating circuit included in and between the ballast and the lamp,
    the ballast having a variable frequency generator which is arranged to vary a frequency of the ballast output over a range of frequencies, with a minimum frequency of 400 kHz,
    the circuit having a reactance such that the circuit is arranged to be resonant to provide a starting voltage for the lamp at or above the minimum frequency,
    wherein a connection to the lamp is arranged so that the lamp can be replaced, and a capacitance is placed in a parallel current path to the lamp, the capacitance being arranged such that disconnection of the lamp from the ballast output disconnects the capacitance from the ballast, the variable frequency generator being so arranged to sweep over a pre-determined range of frequencies to produce by means of a resonant circuit including the said capacitor a specific high frequency high voltage output to ignite the lamp.

12. A thermionic lighting system comprising:
    a high intensity discharge lamp,
    an electronic ballast having a regulated alternating current power sinusoidal waveform output,
    a joint operating circuit included in and between the ballast and the lamp,
    the ballast having a variable frequency generator which is arranged to vary a frequency of ballast output over a range of frequencies, with a minimum frequency of 400 kHz,
    the circuit having a reactance such that the circuit is arranged to be resonant to provide a starting voltage for the lamp at or above the minimum frequency.

* * * * *